United States Patent [19]
Westberg

[11] Patent Number: 5,096,208
[45] Date of Patent: Mar. 17, 1992

[54] MOTOR COVER SEAL

[75] Inventor: Tom Westberg, Waukegan, Ill.

[73] Assignee: Outboard Marine Corporation, Waukegan, Ill.

[21] Appl. No.: 525,908

[22] Filed: May 18, 1990

[51] Int. Cl.$^5$ .................. F16J 15/10; B63H 21/00
[52] U.S. Cl. ................... 277/181; 49/485; 49/497; 123/195 P; 277/186; 277/226; 440/77; 440/900
[58] Field of Search .......... 277/178, 181–184, 277/186, 226; 123/195 C, 195 P; 440/76–78, 900; 49/485, 490, 495, 497, 498; 296/93, 216, 222

[56] References Cited

U.S. PATENT DOCUMENTS

| | | |
|---|---|---|
| 2,265,693 | 12/1941 | Knight . |
| 2,590,288 | 3/1952 | Breyfogle et al. ............... 277/226 |
| 2,910,209 | 10/1959 | Nelson ........................ 277/226 X |
| 3,024,504 | 3/1962 | Miller .......................... 49/495 X |
| 3,090,463 | 5/1963 | Yanada . |
| 4,613,310 | 9/1986 | Suzuki et al. ..................... 440/76 |
| 4,614,347 | 9/1986 | Kruschwitz ..................... 277/184 |
| 4,676,546 | 6/1987 | Igel ............................ 296/222 X |
| 4,698,037 | 10/1987 | Watanabe et al. . |
| 4,708,351 | 11/1987 | Midooka et al. ................. 277/184 |
| 4,709,670 | 12/1987 | Ampferer . |
| 4,800,854 | 1/1989 | Boda et al. . |
| 4,844,031 | 7/1989 | Boda et al. . |
| 4,930,790 | 6/1990 | Sheridan ..................... 277/186 X |
| 4,991,352 | 2/1991 | Hyer ........................... 49/498 X |

FOREIGN PATENT DOCUMENTS

| | | | |
|---|---|---|---|
| 3624968 | 3/1987 | Fed. Rep. of Germany ...... | 296/216 |
| 879886 | 10/1961 | United Kingdom ............. | 49/495 |

Primary Examiner—William A. Cuchlinski, Jr.
Assistant Examiner—Scott W. Cummings
Attorney, Agent, or Firm—Welsh & Katz, Ltd.

[57] ABSTRACT

A motor cover seal for sealing opposed edges of upper and lower outboard motor convers includes an elongate body constructed and arranged for disposition between the opposed edges of the upper and lower covers, an attachment portion on the body configured to be secured to the lower motor cover, and a compressible portion on the body configured to be compressed by the closing of the upper motor cover against the lower motor cover.

6 Claims, 4 Drawing Sheets

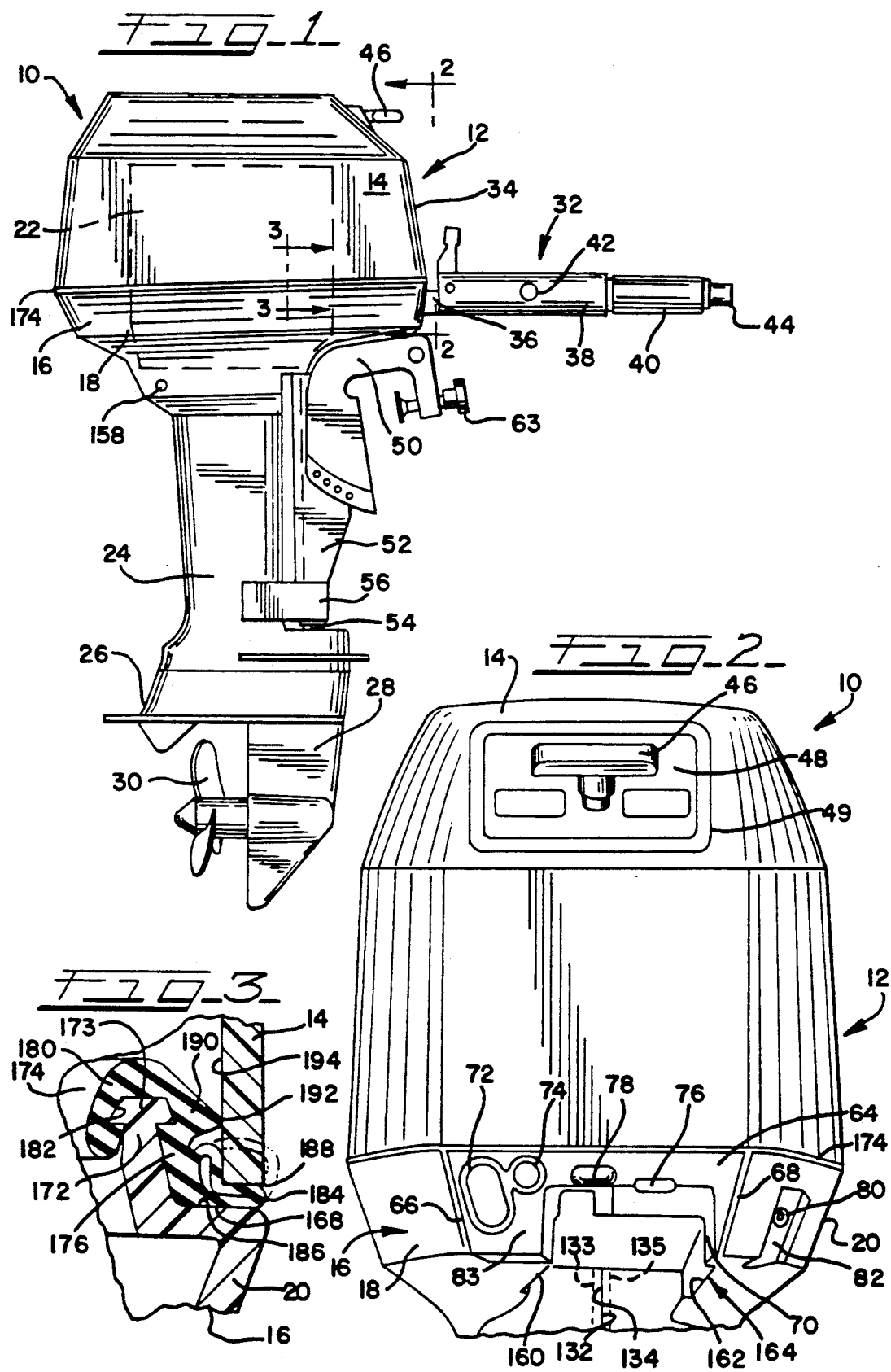

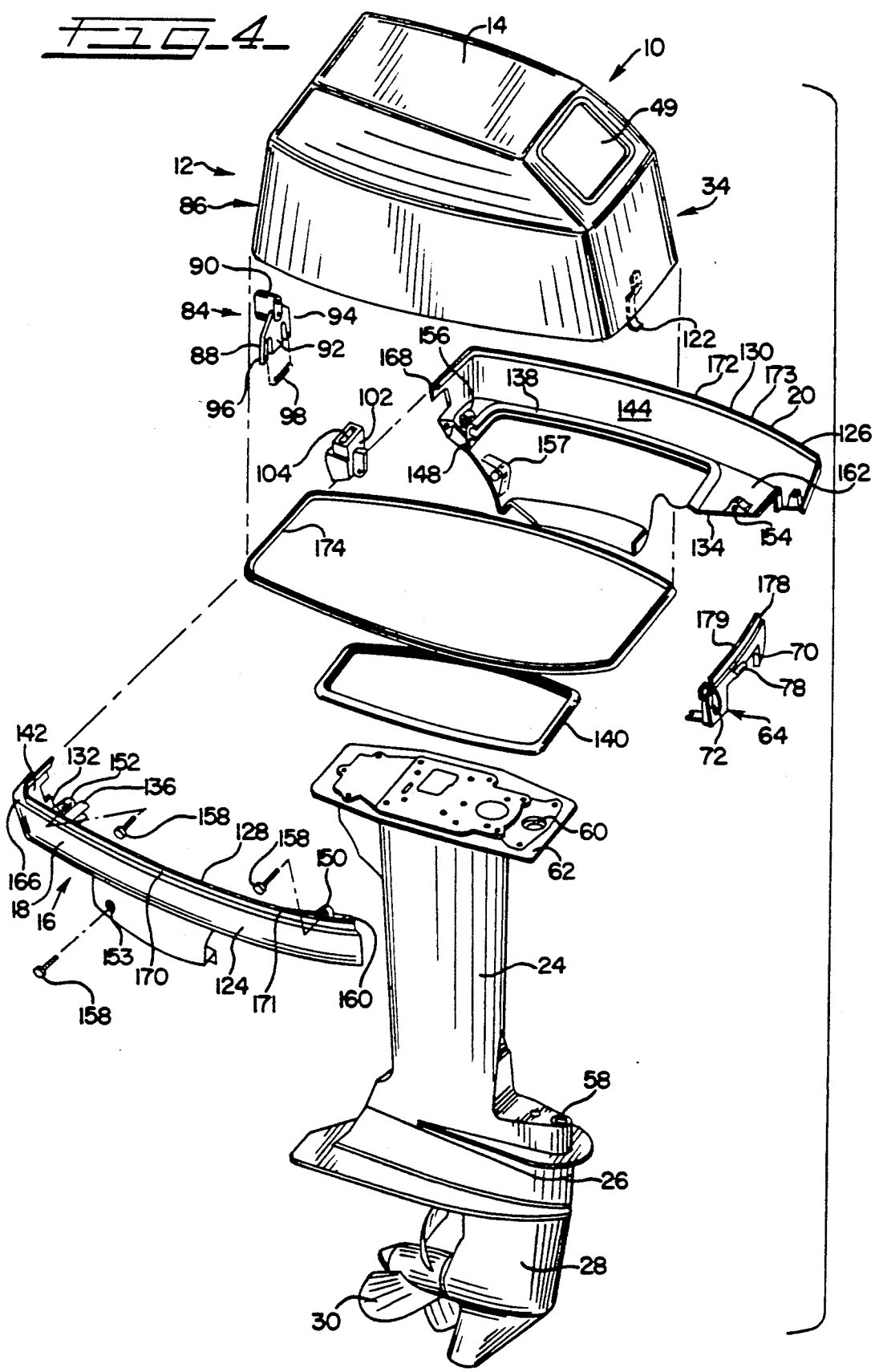

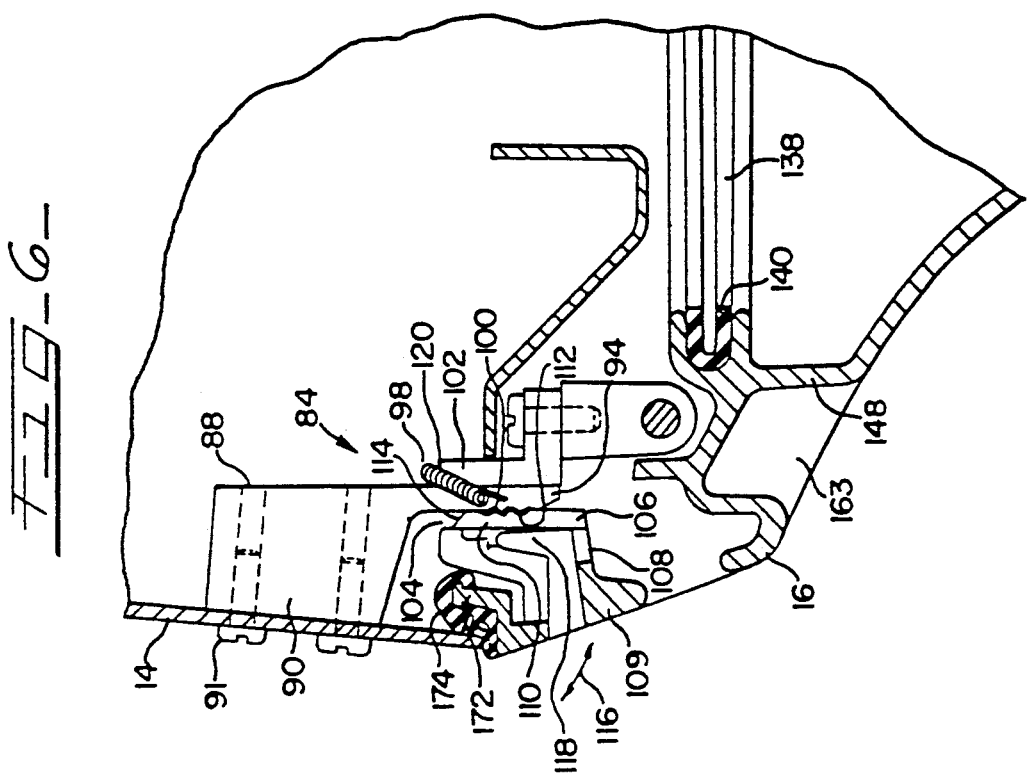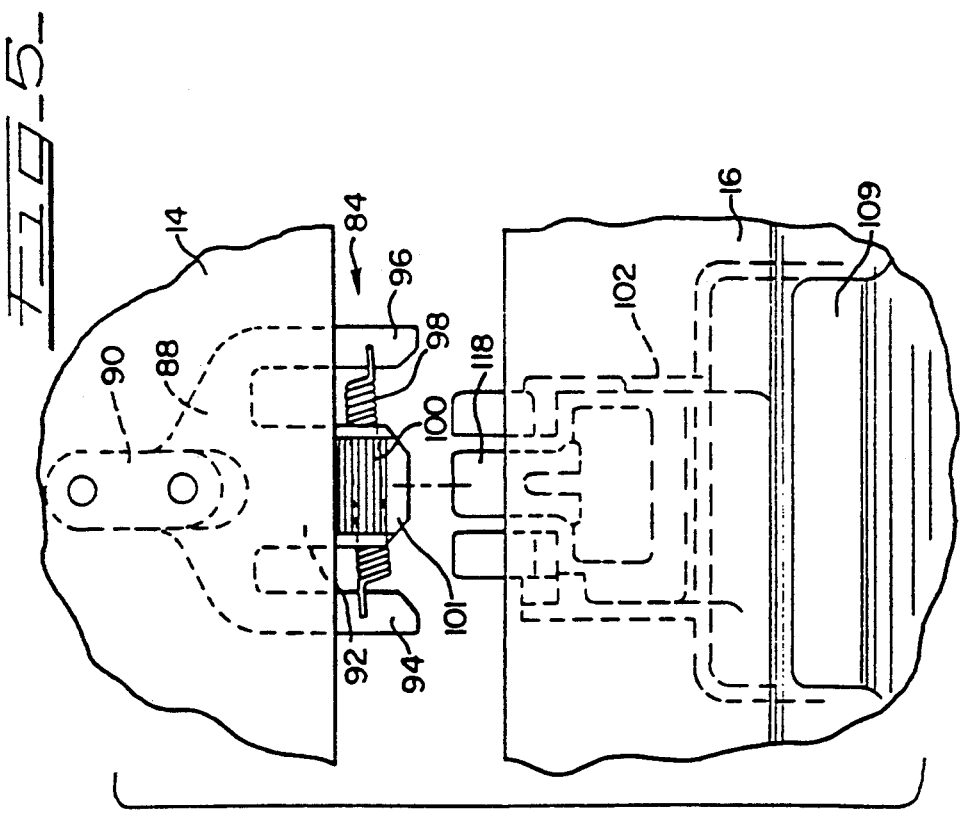

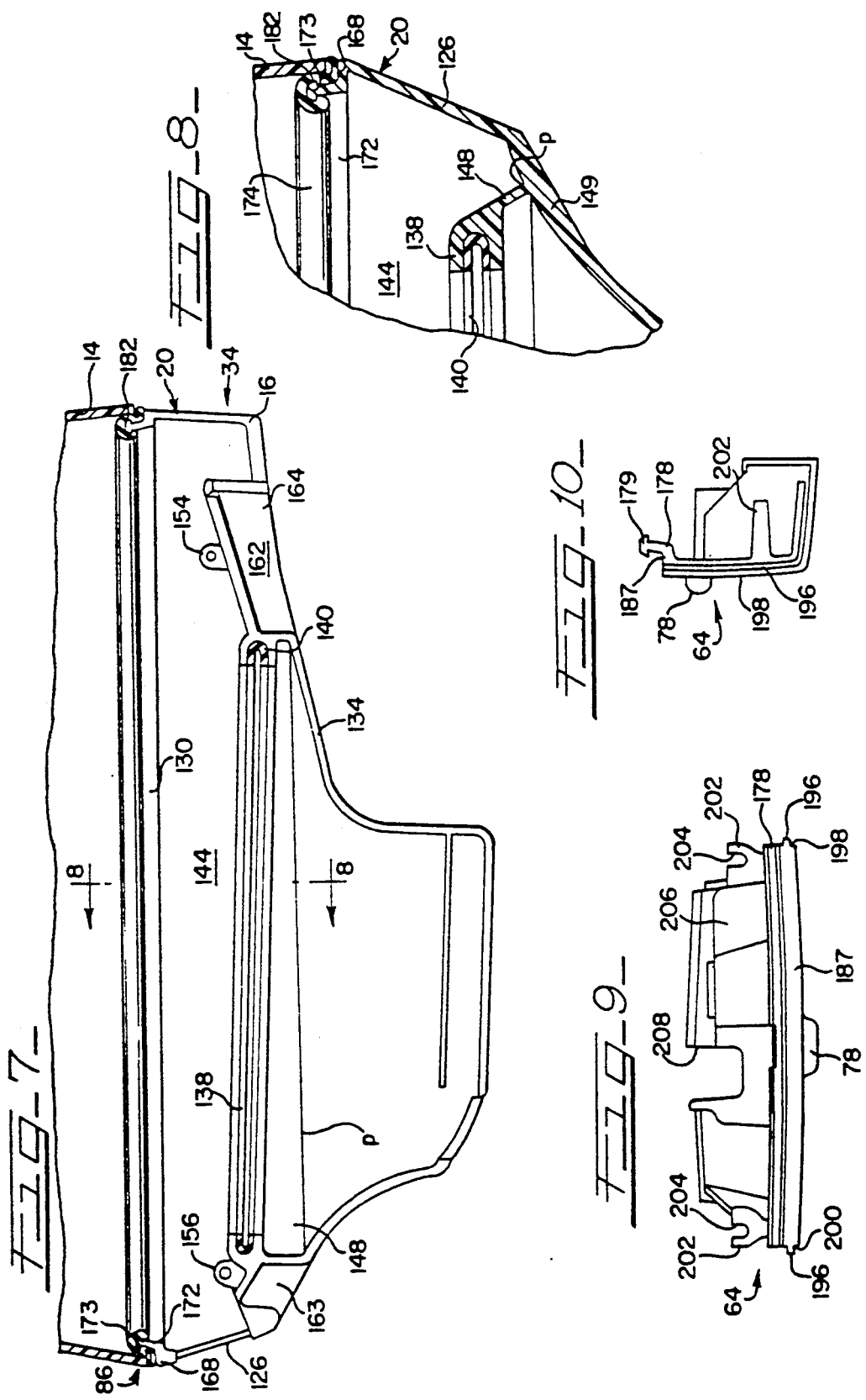

MOTOR COVER SEAL

RELATED APPLICATIONS

The present application is related to commonly assigned, copending patent applications for MOLDED CONTROL PANEL FOR OUTBOARD MOTOR, Ser. No. 07/525,594, filed May 18, 1990, for MOLDED LOWER MOTOR COVER, Ser. No. 07/525,595, filed May 18, 1990, and for MARINE PROPULSION DEVICE COWL ASSEMBLY, Ser. No. 07/526,499, filed May 18, 1990.

BACKGROUND OF THE INVENTION

The present invention relates to outboard marine motors having upper and lower motor covers, and more specifically to a motor cover seal for sealing opposed edges of the upper and lower motor covers against the intrusion of moisture.

An outboard marine motor generally includes an engine portion and a depending gear case. The engine portion of the outboard motor is typically enclosed by upper and lower motor covers which may be collectively referred to as the cowl assembly.

A disadvantage of conventional marine motor cowls relates to the necessity of maintaining a watertight seal between interfacing opposed edges of the upper and lower motor covers. In conventional outboard motor cowls, a continuous looped sealing member is either glued or stitched to either one or both opposing edges of the upper and lower motor covers. Thus, when the cowl is closed, the entry of water into the cowl is prevented. Through use and/or exposure to the elements, the glue or stitching deteriorates, and the seal may become detached from the cover. This deterioration of the seal decreases its water repelling efficiency, and when replacement is required, the fastening of a replacement seal is often a laborious procedure.

Another disadvantage of conventional marine motors is that the lower motor covers of conventional cowl assemblies are fabricated of die cast aluminum, and, as such, require significant machining to complete the manufacturing process of each cover. Consequently, manufacturing costs for producing lower motor covers of die cast aluminum are relatively high. In addition, die cast lower motor covers restrict the available design configurations of such covers, and thus impede motor cowl styling. Furthermore, conventional aluminum die cast lower motor covers require supplemental mounting hardware to enable the attachment of the cover to the motor.

Still another disadvantage of conventional motor cowls relates to the necessity of removing the lower motor cover when maintenance is performed on the engine. In conventional cowls, the motor control systems such as choke, fuel connector, throttle cable and/or remote control cables must also be removed during disassembly of the lower motor covers. This requirement results in excessively costly and time consuming maintenance procedures.

Thus, there is a need for an outboard motor cowl including a positively attached, yet readily replaceable seal for the opposing edges of the upper and lower motor covers. There is also a need for an outboard motor cowl including an easily manufactured and assembled lower motor cover which may be styled in a wide variety of exterior configurations without requiring excessive mounting hardware. In addition, there is a need for a marine motor cowl in which the control systems are accessible without requiring disassembly of the lower motor cover.

SUMMARY OF THE INVENTION

Accordingly, the present invention provides a motor cover seal which may be positively attached to the lower motor cover without the use of adhesives or stitching, and, as such is readily replaceable. More specifically, the present motor cover seal includes an elongate body constructed and arranged for disposition between the corresponding opposed edges of the upper and lower covers, an attachment portion on the body configured to be secured to the lower motor cover, and a compressible portion on the body configured to be compressed by the closing of the upper motor cover against the lower motor cover.

BRIEF DESCRIPTION OF THE DRAWINGS

FIG. 1 is a side elevational view of an outboard marine motor of the type in which the present motor cover seal may be employed;

FIG. 2 is a front elevational view of the motor of FIG. 1, taken generally along the line 2—2 of FIG. 1 and in the direction indicated generally, with certain parts removed for clarity;

FIG. 3 is a fragmentary sectional view taken generally along line 3—3 of FIG. 1 and in the direction indicated generally;

FIG. 4 is an exploded front perspective elevational view of the marine outboard motor of FIG. 1;

FIG. 5 is a fragmentary rear exploded view of a latch portion of the motor of FIG. 4;

FIG. 6 is a fragmentary vertical sectional view of the latch portion depicted in FIG. 5, shown in the closed position;

FIG. 7 is a side elevational view of one of the motor cover halves shown in FIG. 4;

FIG. 8 is a fragmentary sectional view taken generally along the line 8—8 of FIG. 7 and in the direction indicated generally;

FIG. 9 is a top plan view of the control panel shown in FIG. 4; and

FIG. 10 is a side elevational view of the control panel of FIG. 9.

DESCRIPTION OF THE PREFERRED EMBODIMENT

Referring to FIG. 1, an outboard motor 10 is provided with a motor cowl 12 which includes an upper motor cover 14 and a lower motor cover 16, the lower motor cover 16 being provided in two parts, a first cover portion 18 and a second cover portion 20 (best seen in FIG. 4). The first and second cover portions 18, 20 are generally mirror images of each other and are 1 configured to meet and partially enclose an internal combustion engine 22 (shown hidden in FIG. 1). The cover portions 18, 20 are preferably injection-molded of a thermoplastic material; however, other molding processes are contemplated, including, but not limited to, sheet molding. The material used for the cover portions 18, 20 is preferably a rigid plastic, such as an impact modified thermoplastic polyester alloy with 30% glass reinforcement such as VANDAR 4662 Z available from Celanese Corporation. The use of injection molded plastic for the lower motor cover 16 permits a wider variety of styling configurations than is available from conventional die cast aluminum covers.

An exhaust housing 24 depends from the engine 22 and is attached at a lower end 26 to a gear case housing 28. A propeller 30 is provided at a lower rear portion of the gear case housing 28 for propelling a boat through water, as is well known.

A steering handle assembly 32 is located at a front end 34 of the motor 10. The steering handle assembly 32 includes a steering arm or bracket 36, a tiller handle 38, an axially rotatable grip portion 40 and a stop switch assembly 42 located on the assembly 32. A starter rope handle 46 is disposed within a recessed mounting panel 48 which is secured within an opening 49 (best seen in FIG. 4) in the upper motor cover 14.

A stern bracket assembly 50 is provided with a vertical housing 52 including a shaft 54 axially disposed therein. A bracket 56 attached to the exhaust housing 24 surrounds a lower end of the housing 52 and permits pivotal movement of the housing 52. A lower end of the shaft 54 pivotally engages a pivot bore 58 (best seen in FIG. 4) of the exhaust housing 24, and an upper end of the shaft 54 engages a pivot bore 60 located in an upper flange 62 of the exhaust housing 24 (best seen in FIG. 4). The stern bracket assembly 50 also includes at least one and preferably two threaded clamp members 6 for securing the bracket assembly 50 to the stern of a boat as is well known. The stern bracket assembly 50 permits the motor 10 to be pivotally controlled by the steering assembly 32 for steering purposes.

Referring now to FIGS. 2 and 4, the motor 10 further includes a control panel 64 centrally disposed between respective front edges 66, 68 of the first and second cover portions 18 and 20. The control panel 64 includes at least one motor control access opening, such openings possibly including a steering bracket opening 70 configured to allow the passage of the steering bracket 36 therethrough, a remote control shift and throttle cable access opening 72, a choke control access opening 74, and/or a twist grip throttle cable opening 76. An outwardly projecting latch attachment formation 78 (best seen in FIGS. 9 and 10) is centrally located upon a front surface 79 of the control panel 64. A fuel line connector location 80 may be secured to a support formation 82 located either on the second cover portion 20, as shown, on the first cover portion 18, or to the control panel 64 at point 83.

Referring now to FIGS. 4, 5 and 6, the upper motor cover 14 is secured to the lower motor cover 16 by means of a latch assembly 84 located at the rear end 86 of the motor 10. The latch assembly 84 includes a latch hook 88 secured at a head end 90 to a lower rear portion of the upper motor cover 14 by means of fasteners 91 (best seen in FIG. 6), which may be threaded fasteners or rivets. The latch hook 88 further includes a depending body 92 and a pair of depending arms 94, 96. A tension spring 98 is secured at each end to one of the depending arms 94, 96 and is disposed upon the latch hook 88 so as to be generally horizontal. The hook body 92 is provided with a plurality of parallel serrations 100 on a rear face 101.

The latch assembly 84 also includes a latch body 102 which defines a cavity 104 configured for accommodation of the latch hook 88. The latch body 102 includes a generally L-shaped latch handle 106 having a gripping leg 108 with a handle 109, and a generally vertically positioned serrated leg 110. The serrated leg 110 has a plurality of serrations 112 on an inner face thereof which are disposed so as to operationally engage the serrations 100 on the latch hook 88. The latch handle 106 is secured at an upper end 114 to the latch body 102 so that the latch handle pivots in a general direction indicated by the arrow 116. The latch assembly 84 is preferably fabricated of durable plastic, and as such, the upper end of the latch handle 106 may be integral with the latch body 102. A leaf spring 118 is secured to the latch body 102 at a lower end of the cavity 104 to bias the latch handle 106 against the latch hook body 92 so that the serrations 112 lockingly engage the serrations 100 and prevent upward movement of the upper motor cover 14 once the latch assembly 84 is closed (best seen in FIG. 6).

Referring now to FIG. 6, which shows the latch assembly 84 in the closed or locked position, when the upper cover 14 is locked in position upon the lower cover 16, the spring 98 is held in an extended, biased position against a ledge or shoulder 120 of the latch body 102. When the latch hook 88 is to be released, the operator pulls the handle 109, which overcomes the biasing force of the spring 118, and releases the engagement between the serrations 100, 112. At this point, the spring 98 is free to resume its generally unbiased, horizontal position (best seen in FIG. 5) and, in so doing, forces the upper cover 14 to pop up. Thus, this operational aspect of the latch assembly 84 gives the operator an indication that the upper motor cover 14 has been released, and also allows the operator to remove the upper motor cover 14 one-handed.

Referring now to FIG. 4, at the front end 34 of the motor 10, the upper motor cover 14 and lower motor cover 16 are releasably secured to each other by means of a hook 122 which depends from a front end portion of the cover 14. The hook 122 is configured to engage the latch attachment formation 78 located on the control panel 64.

Referring now to FIGS. 3, 4, 7 and 8, the lower motor cover 16 of the invention is described in greater detail. Each of the first and second cover portions 18, 20, which are generally configured to be mirror images of each other, respectively, includes an outer wall 124, 126, an upper edge 128, 130, and an inside edge 132, 134. When the first and second motor cover portions 18, 20, respectively, are secured to each other (best seen in FIG. 2), the respective inside edges 132, 134 are in engagement with each other. If desired, the inside edges 132, 134 may be provided with mating tongue-in-groove configurations 137, 135 (shown hidden in FIG. 2) for attaching the first and second cover portions 18, 20 to each other in a manner which inhibits the entry of moisture into the cowl 12.

Each cover portion 18, 20 is provided with a respective laterally opening groove formation 136, 138, the groove formation being integral with and being disposed generally horizontal relative to the outer wall 124, 126 of each of the cover portions 18, 20. The groove formations 136, 138 are configured so that when the lower motor cover 16 is assembled, a substantially rectangular groove is defined. The groove formations 136, 138 are also dimensioned to accommodate the upper flange 62 of the exhaust housing 24 (best seen in FIG. 4), when the flange 62 is equipped with an annular elastomeric seal 140. The seal 140 is disposed around the flange 62 and the assembled seal and flange are then seated within the groove formations 136, 138. In this manner, the lower motor cover 16 is securely disposed relative to the motor 10 and is sealed from entry of moisture from below.

The groove formations 136, 138 are each integrally joined to a respective inner face 142, 144 of each of the motor cover portions 18, 20 by means of a preferably continuous web 146, 148. In view of the fact that the lower motor cover portions 18, 20 are each preferably injection molded, and as such a wide variety of motor cowl styling configurations are available, including forming the outer walls 124, 126 to be as smooth as possible for aesthetic reason.. As such, it would be undesirable for so-called "sink" marks to appear on the exterior of the walls 124, 126 to indicate a linear attachment point "P" of the web 148 to the inner face 142, 144 of the motor cover portions 18, 20. In order to avoid any sink marks appearing on the outer walls 124, 126, it is preferred that the outer walls 124, 126 be thickened along the linear attachment point "P" relative to the thickness of the web 148. The thickened portion is designated 149 (best seen in FIG. 8). It is preferred that the thickness of the web 148 be as small as possible relative to the thickness of the thickened portion 149 and still be capable of supporting the groove formations 136, 138.

Referring now to FIGS. 4 and 7, the first and second motor cover portions 18, 20 are secured to each other by means of front, rear and lower integral boss formations, respectively designated 150, 152 and 153 on the cover portion 18, and 154, 156 and 157 on the cover formation 20. The corresponding front boss formations 150, 154, rear boss formations 152, 156 and lower boss formations 153, 157 are generally coaxially aligned to permit the engagement therethrough of threaded fasteners 158. The boss formations 150, 152, 153, 154, 156 and 157 ensure secure attachment of the cover portions 18, 20 without the necessity of excessive supplemental mounting hardware. The first and second motor cover portions 18, 20 are also provided with steering arm channel formations 160, 162 which, when joined, form a steering arm channel 164 (best seen in FIG. 2). A rear gripping recess 163 is also integrally formed at the rear 34 of each cover portion 18, 20.

Referring now to FIGS. 3, 4, 7 and 10, the upper edges 128, 130 of each of the lower motor cover portions 18, 20 are provided with a shoulder respectively designated 166, 168 and an upwardly projecting seal retaining formation respectively designated 170, 172. The respective upper ends 171, 173 of each of the seal retaining formations 170, 172 have a barb-shaped, frustoconical or trapezoidal cross-section (best seen in FIG. 3).

An elastomeric motor cover seal 174 is provided which defines a generally rectangular shape (best seen in FIG. 4). The seal 174 is preferably made of vinyl nitrile or equivalent material and is extruded as one elongate piece, the ends of which are joined together by adhesive or equivalent permanent bonding procedure. The seal 174 includes an elongate body 176 configured to be secured upon the seal retaining formations 170, 172, and which conforms to the generally rectangular shape defined by the upper edges 128, 130 of the lower motor cover portions 18, 20, as well as by an upper edge 178 of the control panel 64. The upper edge 178 of the control panel 64 is also provided with a barb-shaped, frustoconical or trapezoidal seal retaining formation 179. The seal 174 also includes an attachment portion 180 which defines a generally barb-shaped, frustoconical or trapezoidal recess 182 dimensioned to matingly engage the barb-shaped upper ends 171, 173 of the seal retaining formations 170, 172.

The seal body 176 also includes a compressible tubular portion 184 which is integral with the body 176 and which has a lower end 186 configured to seat upon the shoulders 166, 168, as well as upon a shoulder 187 of the control panel 64. The tubular portion 184 is disposed on the seal 174 relative to the shoulders 166, 168 and 187 so that a lower edge 188 of the upper motor cover 14 which opposes the upper edges 128, 130 of the lower motor covers 16, 18 will engage and vertically compress the tubular portion in a similar manner to that shown in FIG. 3. In this manner, the entry of moisture into the cowl 12 is prevented. In addition, the seal body 176 includes a wiping formation 190 which is integral with the body 176. The wiping formation 190 is outwardly projecting and generally wedge-shaped, and has a tip 192. The tip 192 is designed to be biased against an inside wall 194 of the upper motor cover 14. The wiping formation 190 and the tip 192 are provided with the wedge shape in order to guide the upper motor cover 14 to its closed position upon the lower motor cover 16. Also, the tip 192 will exert a slight outward biasing force against the upper motor cover 14 to maintain the cover under compression and to hold the cover in position.

Referring now to FIGS. 2, 4, 9 and 10, the control panel 64 is described in greater detail. The control panel 64 includes vertical tongue formations 196 on each of the two vertical side edges 198, 200 for engagement with corresponding groove formations (not shown) on the forward edges 66, 68 of the lower motor cover portions 18, 20. In addition, each side portion 198, 200 includes a mounting tab 202 having a U-shaped recess 204 to facilitate the attachment of the control panel 64 to each forward edge 66, 68 of the respective lower motor cover portions 18, 20. In an alternative embodiment, additional U-shaped tabs can be located at the upper and outer edges of the control panel to restrict any lateral motion of the side covers. A rear body portion 206 includes a recess formation 208 to accommodate the shift linkage of the motor 10 (not shown). It is preferred that the control panel 64 is fabricated by injection molding or other molding process using similar thermoplastic materials as are used to fabricate the lower motor cover portions 18, 20.

The cowl 12 is assembled upon the motor 10 by placing the seal 140 around the flange 62 of the exhaust housing 24. The lower motor cover portions 18, 20 are then positioned on either side of the exhaust housing 24 so that the seal 140 and the flange 62 are engaged in the grooves 136, 138. The control panel 64 is then secured at the front edges 66, 68 of the respective lower motor cover halves 18, 20 by means of the tabs 204. The lower motor cover portions 18, 20 are then secured to each other by means of the fasteners 158. Next, the rectangular-shaped seal 174 is secured to the upper edges 128, 130 of the lower motor cover 16 by means of the barb-shaped recess formation 182 being pressed upon the barb-shaped seal retaining formations 170, 172.

Concurrently with the attachment of the lower motor cover portions 18, 20 and the control panel 64 to each other, the latch assembly 84 may be assembled by securing the latch hook 88 to the rear end 86 of the upper motor cover 14 and the latch body 102 to the lower motor cover 16. Likewise, the hook 122 is anchored to the front end 34 of the upper motor cover 14 for engagement with the latch attachment formation 78 on the control panel 64. As the upper motor cover 14 is secured to the lower motor cover 16, the tubular portion 184 of the seal 174 is compressed and the wedge-shaped wiping formation 190 engages the inner face 194 of the upper motor cover 14 to maintain it in position and to create a watertight seal for the motor 10.

Thus, the present motor cover seal may be positively attached to the upper edge of the motor cover portions without the use of adhesive or stitching, and is readily replaceable when necessary.

While a particular embodiment of the motor cover seal of the invention has been shown and described, it will be appreciated by those skilled in the art that changes and modifications may be made thereto without departing from the invention in its broader aspects and as set forth in the following claims.

What is claimed is:

1. A motor cover seal for sealing opposed edges of upper and lower outboard motor covers, comprising:
    an elongate body constructed and arranged for disposition between the opposed edges of the upper and lower covers;
    an attachment portion integral with said body and configured to be secured to the lower motor cover;
    a compressible portion integral with said body and configured to be compressed by the closing of the upper motor cover against the lower motor cover;
    a wiping formation disposed on said body and being integral with said attachment portion and said compressible portion, said wiping formation being provided with a wedge-shaped configuration to wipingly and sealingly engage the upper motor cover as it compresses the compressible portion, said wiping formation having an inclined upper edge which directs the upper motor cover into engagement with said compressible portion;
    said seal configured to be attachable to said motor cover without supplemental fasteners.

2. The seal as defined in claim 1 wherein said compressible portion is tubular.

3. The seal as defined in claim 1 wherein said attachment portion has a recess configured to accommodate a fastening portion of the lower motor cover therein.

4. The seal as defined in claim 3 wherein said recess is barb-shaped.

5. A motor cover seal for an outboard motor having upper and lower motor covers, the covers being engageable along opposed edges, said seal comprising:
    an elongate body dimensioned for disposition between upper and lower covers along the entire length of the covers;
    an attachment portion integral with said body defining a barb-shaped recess configured to be secured to the lower motor cover;
    a compressible portion integral with said body and being configured to be compressed by the closing of the edge of the upper motor cover against the opposed edge of the lower motor cover; and
    a wiping formation disposed on said body and being integral with said attachment portion and said compressible portion, said wiping formation being configured to wipingly and sealingly engage the upper motor cover as it compresses the compressible portion against the opposing edge of the lower motor cover, said wiping formation being provided with a wedge shape and an inclined upper edge for exerting a slight outwardly directed biasing force against an inner surface of the upper motor cover to guide the upper motor cover to a closed position.

6. A motor cover seal for an outboard motor having upper and lower motor covers, the covers being engageable along opposed edges, the lower motor cover having an upwardly projecting, barb-shaped seal retaining formation along an upper edge, and a shoulder, said seal comprising:
    an elongate body dimensioned for disposition between upper and lower covers along the entire length of the covers;
    an attachment portion integral with said body and defining a barb-shaped recess configured to be secured to the barb-shaped formation on the lower motor cover;
    a tubular compressible portion integral with said body and being configured to be disposed upon the shoulder of the lower motor cover, and to also be compressed by the closing of the edge of the upper motor cover against the opposing edge of the lower motor cover; and
    a wiping formation disposed on said body and being integral with said attachment portion and said compressible portion, said wiping formation being located on a general decline below said attachment portion and above said compressible portion, said wiping formation being configured to wipingly and sealingly engage the upper motor cover as it compresses the compressible portion against the shoulder on the opposing edge of the lower motor cover, said wiping formation being provided with a wedge shape and an inclined upper edge for exerting a slight outwardly directed biasing force against an inner surface of the upper motor cover for maintaining the cover under compression and for guiding the upper motor cover to a closed position;
    said seal configured to be attachable to said motor cover without supplemental fasteners.

* * * * *